United States Patent
Bianchi et al.

(10) Patent No.: US 10,013,682 B2
(45) Date of Patent: Jul. 3, 2018

(54) STORAGE AND RECOVERY OF DIGITAL DATA BASED ON SOCIAL NETWORK

(71) Applicant: International Business Machines Corporation, Armonk, NY (US)

(72) Inventors: Silvia C. S. Bianchi, Sao Paulo (BR); Alan Braz, Sao Paulo (BR); Heloisa Caroline de Souza Pereira Candello, Sao Paulo (BR); Claudio S. Pinhanez, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 14/621,602

(22) Filed: Feb. 13, 2015

(65) Prior Publication Data

US 2016/0239486 A1    Aug. 18, 2016

(51) Int. Cl.
| | |
|---|---|
| *G06Q 20/10* | (2012.01) |
| *G06Q 20/22* | (2012.01) |
| *G06F 21/62* | (2013.01) |
| *G06Q 50/00* | (2012.01) |
| *G06F 17/30* | (2006.01) |
| *H04L 29/08* | (2006.01) |

(52) U.S. Cl.
CPC ......... *G06Q 20/10* (2013.01); *G06F 17/3007* (2013.01); *G06F 21/6245* (2013.01); *G06Q 20/223* (2013.01); *G06Q 50/01* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 5,493,614 | A | 2/1996 | Chaum |
| 5,764,767 | A | 6/1998 | Beimel et al. |
| 5,768,385 | A | 6/1998 | Simon |
| 5,781,631 | A | 7/1998 | Chaum |
| 5,901,229 | A | 5/1999 | Fujisaki et al. |

(Continued)

FOREIGN PATENT DOCUMENTS

| | | |
|---|---|---|
| EP | 0 772 165 B1 | 8/2004 |
| EP | 1 472 814 | 11/2004 |

(Continued)

OTHER PUBLICATIONS

Pedersen, "Non-interactive and information-theoretic secure verifiable secret sharing" Advances in Cryptology-CRYPTO'91. Springer Berlin Heidelberg (1992) pp. 129-140.

(Continued)

*Primary Examiner* — Alex Gofman
(74) *Attorney, Agent, or Firm* — Scully, Scott, Murphy & Presser, P.C.; Louis J. Percello, Esq.

(57) ABSTRACT

Backup and restore of digital data may utilize online social network parameters of a user to determine a number of parts into which to divide digital data and distribute the parts. A list of friends from the social network friends may be selected, e.g., based on a relationship to the user in the social network, to store the parts. The parts may be stored in a friend's device memory, each of the parts stored with a different friend. The digital data may be reconstructed by obtaining a threshold number of parts from the friends.

11 Claims, 6 Drawing Sheets

(56) References Cited

U.S. PATENT DOCUMENTS

| | | |
|---|---|---|
| 6,662,299 B1 | 12/2003 | Price, III |
| 7,103,915 B2 | 9/2006 | Redlich et al. |
| 7,886,034 B1 | 2/2011 | Hartmann et al. |
| 8,015,211 B2 | 9/2011 | Marceau et al. |
| 8,051,205 B2 | 11/2011 | Roy et al. |
| 8,239,492 B2 | 8/2012 | Pottenger |
| 8,243,933 B2 | 8/2012 | Schneider |
| 8,255,736 B2 | 8/2012 | Agundez Dominguez et al. |
| 8,280,958 B2 | 10/2012 | Chavez et al. |
| 8,281,023 B2 | 10/2012 | Dondeti et al. |
| 8,296,398 B2 | 10/2012 | Lacapra et al. |
| 8,307,026 B2 | 11/2012 | Gusler et al. |
| 8,316,098 B2 | 11/2012 | Luna et al. |
| 8,352,692 B1 | 1/2013 | Jordan |
| 8,356,080 B2 | 1/2013 | Luna et al. |
| 8,364,758 B2 | 1/2013 | Hydrie et al. |
| 8,458,172 B2 | 6/2013 | Gerber et al. |
| 8,549,290 B2 | 10/2013 | Nishimaki et al. |
| 2001/0007983 A1 | 7/2001 | Lee |
| 2006/0136903 A1 | 6/2006 | Childress et al. |
| 2007/0168266 A1* | 7/2007 | Questembert ......... G06Q 20/06 705/35 |
| 2007/0244745 A1 | 10/2007 | Boal |
| 2009/0157814 A1 | 6/2009 | Lee et al. |
| 2011/0213975 A1 | 9/2011 | Sorniotti et al. |
| 2011/0276538 A1* | 11/2011 | Knapp ................. G06F 17/302 707/626 |
| 2012/0311339 A1 | 12/2012 | Irvine |
| 2013/0007218 A1 | 1/2013 | Shah et al. |
| 2013/0031171 A1 | 1/2013 | Serena |
| 2013/0073865 A1 | 3/2013 | Kornafeld et al. |
| 2013/0085916 A1 | 4/2013 | Abbe et al. |
| 2013/0103521 A1 | 4/2013 | Liu |
| 2013/0317972 A1 | 11/2013 | Morgenstern et al. |
| 2013/0317984 A1 | 11/2013 | O'Leary et al. |
| 2013/0325701 A1 | 12/2013 | Schwartz |
| 2014/0281550 A1* | 9/2014 | Resch ................... H04L 9/0822 713/171 |
| 2014/0297742 A1* | 10/2014 | Lyren .................... H04L 65/403 709/204 |
| 2015/0006635 A1 | 1/2015 | Lin et al. |
| 2015/0193537 A1* | 7/2015 | Cierniak ........... G06F 17/30867 707/733 |

FOREIGN PATENT DOCUMENTS

| | | |
|---|---|---|
| EP | 1 573 592 | 9/2005 |
| EP | 1 952 255 | 8/2008 |
| EP | 2 634 738 A1 | 9/2013 |
| WO | 99/26207 | 5/1999 |
| WO | 02/065329 A1 | 8/2002 |
| WO | 02/089488 A1 | 11/2002 |
| WO | 03/065643 A2 | 8/2003 |
| WO | 2004/019158 A3 | 3/2004 |
| WO | 2004/046969 A1 | 6/2004 |
| WO | 2005/062572 A1 | 7/2005 |
| WO | 2007/053727 A2 | 5/2007 |
| WO | 2007/100509 A1 | 9/2007 |
| WO | 2008/065345 A1 | 6/2008 |
| WO | 2009/002835 A2 | 12/2008 |
| WO | 2009/142851 A3 | 11/2009 |
| WO | 2012/093835 A3 | 7/2012 |
| WO | 2013/005189 A2 | 1/2013 |
| WO | 2013/065008 A1 | 5/2013 |

OTHER PUBLICATIONS

Essex et al., "Oblivious Printing of Secret Messages in a Multi-party Setting" Financial Cryptography and Data Security. Springer Berlin Heidelberg (2012) pp. 359-373.

Viehmann, "The theory of creating trust with a set of mistrust-parties" Privacy, Security and Trust (PST), 2012 Tenth Annual International Conference on. IEEE (2012) 10 pages.

Ali et al., "A trust based approach for protecting user data in social networks" Proceedings of the 2007 conference of the center for advanced studies on Collaborative research. IBM Corp., (2007) pp. 1-4.

Vu et al. "Enabling secure secret sharing in distributed online social networks" Computer Security Applications Conference, 2009. ACSAC'09. Annual, IEEE (2009) pp. 419-428.

Blakley, G.R. "Safeguarding cryptographic keys" Proceedings of the 1979 AFIPS National Computer Conference (Jun. 4-7, 1979) pp. 313-317.

Shamir, A. "How to Share a Secret" Communications of the ACM (Nov. 1979) pp. 612-613, vol. 22, No. 11.

Office Action dated Apr. 20, 2017 received in U.S. Appl. No. 14/747,253, 26 pages.

* cited by examiner

STORAGE AND RECOVERY OF DIGITAL DATA BASED ON SOCIAL NETWORK

FIELD

The present application relates generally to computers and computer applications, and more particularly to computer data storage and recovery.

BACKGROUND

Backup and restore systems store and recover electronic documents. Digital data that represent certain physical elements in a computer, however, may still not have the ability of recoverability. For instance, digital data that may represent physical items such as physical cash may be transferable among different computer systems belonging to different organizations, but usually are not recoverable.

BRIEF SUMMARY

A method and system for backing up digital data may be provided. The method, in one aspect, may comprise detecting a backup event trigger to backup digital data representing digital cash of a user. The method may further comprise retrieving online social network profile of the user. The method may further comprise determining parameters associated with the digital data, the user, and social network friends of the user, the parameters associated with the user and the social network friends of the user determined at least from the online social network profile of the user. The method may further comprise determining a number of parts and a threshold based on the parameters. The method may also comprise dividing the digital data using one or more of secret sharing and splitting method into the number of parts. The method may also comprise selecting a list of friends from the social network friends to store the number of parts. The method may also comprise storing a part of the digital data divided into the number of parts in a respective friend's device, each of the parts stored with a different friend in the list of friends.

A system of backing up digital data, in one aspect, may comprise a processor operable to detect a backup event trigger to backup digital data representing digital cash of a user. The processor may be further operable to retrieve online social network profile of the user. The processor may be further operable to determine parameters associated with the digital data, the user, and social network friends of the user, the parameters associated with the user and the social network friends of the user determined at least from the online social network profile of the user. The processor may be further operable to determine a number of parts and a threshold based on the parameters, and store the number of parts and the threshold in memory. The processor may be further operable to select a list of friends from the social network friends to store the number of parts. The processor may be further operable to transmit a part of the digital data divided into the number of parts to a respective friend's device for storing in the respective friend's device. Each of the parts may be stored with a different friend in the list of friends.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
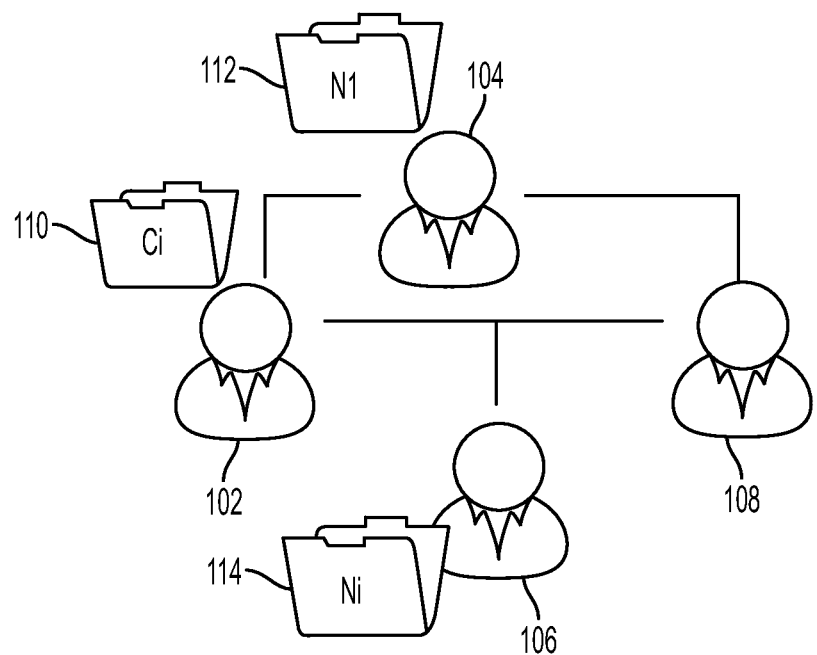
FIG. 1 illustrates an overview of a use case scenario in one embodiment of the present disclosure.

Techniques are disclosed that store and recover digital data, for example, digital cash, based on a social network, for example, a social network of friends. The techniques may utilize one or more computers, connected in a network such as peer-to-peer network, and a database comprising one or more parameters, including those associated with the social network. The techniques may include one or more processes that uses the parameters to establish a number of copies of one or more secure documents such as cash data and determines how many of those copies are required to re-compose the secure document such as cash data. The processes may recreate or restore the secure documents such as cash data using input from a subset of the copies. The copies are secure and only usable with a key that a user has.

Peer-to-peer (P2P) computing or networking is a distributed application architecture that partitions tasks or workloads between peers. Peers are equally privileged, equipotent participants in the application. They are said to form a peer-to-peer network of nodes. Peers make a portion of their resources, such as disk storage, directly available to other network participants, without the need for central coordination by servers or stable hosts. Peers are both suppliers and consumers of resources, in contrast to the traditional client-server model in which the consumption and supply of resources is divided.

The parameters may include but are not limited to one or more of document parameters such as digital cash data parameters, network parameters, description, and user parameters. The document parameters (e.g., digital cash parameters) may include but are not limited to one or more of document or data attributes, value of a virtual currency or coin, expiration date. The network parameters may include but are not limited to one or more of the number of connections (friends), other social network attributes such relationships between connection or friends (friends), degree of relationship (such as family, close friends, co-workers, same education background, school, same location or city or acquaintances), mutual friends, interactivity (type and frequency of interactions between users), location, time, routine indicated by the location and time of the activity in the social network, and availability or connectivity of the friend in the network. The user parameters may include but are not limited to one or more geography, location, time, routine, network type (such as a public network, company's wifi, telecom 3G or home cable provider).

In one aspect, the one or more combinations of the parameters may be used as criteria for determining membership in a cooperating set of nodes (e.g., friends in an online social network), for example, in selecting nodes in a social network to participate in the distributed representation of part of the digital data that is to be "secretly shared."

An example of the digital data or document includes virtual currency or digital cash, also referred to as electronic cash, electronic currency, or digital coin. More specifically, an embodiment of a methodology in the present disclosure may include secret sharing to backup and recover the digital cash. In one embodiment, a copy of the digital cash may be divided into shares and distributed to the friends of a social network. In one embodiment, the number of shares and the threshold (e.g., the minimum number of shares required to restore the digital coin) is defined based on a set of characteristics or parameters of the digital cash (e.g., value, expiration date), social network (e.g., friends, interactions, relationship, mutual friends, routine, availability), and user (e.g., geographical location, routine).

Digital cash is a digital version of physical cash that should fulfill with similar properties such as privacy (anonymity and payment untraceability), transferability and security. Representing physical cash, digital cash can be used to trade goods or services between parties. A drawback of physical cash is that in case of loss or theft, it is not possible to recover the amount. In the present disclosure, a system and a method are presented that implement secret sharing based on online social network to backup and recover the digital cash that is stored in the user's local device. In one aspect, decentralized approaches can save infrastructure resources of organizations such as a bank and reduce the communication overhead in storing the digital cash.

One or more techniques disclosed herein in one aspect may provide for recoverability of storage of data such as digital cash in case of loss or damage. The techniques in this disclosure may leverage trust relationships between users in a social network to enable backup.

In social networking or online social network, social media programs (e.g., internet-based tools) may be used to make connections and interact on line with friends. Social media programs, for example, are computer-implemented tools that allow users to create, share and exchange or communicate information or content, for instance, in the forms of text, video, pictures, and/or others. Online social network or networking allows virtual communities to be formed among users. A user profile may be created and stored for each user of a social network or social networking application or tool. The user profile may store information such as user's interests, friends or connections. For instance, an individual user's identifying information may be created and stored, for example, when that individual user signs up for a social networking site or such service. Profile information may include a username, contact information, personal or business interests, a photo, bio, or other data. A friend, for example, is a user who is accepted into an individual user's social network, for example, connected to the individual user.

FIG. 1 illustrates an overview of a use case scenario in one embodiment of the present disclosure. A methodology of the present disclosure may rely on a social network and leverage the trust relationship based on social relationship among users of the social network to distribute and store parts of a copy of the digital cash. For instance, a social network may include a plurality of users 102, 104, 106, 108, e.g., connected directly or indirectly to one another in a peer-to-peer network. A user 102 registers in a system implementing a methodology of the present disclosure and authorizes it to access the social network profile of the user, e.g., through authentication. Responsive to the user 102 purchasing or acquiring a digital coin C 110, the system may use a secret sharing algorithm to divide a copy of the coin C 110 into a number (n) of parts and distribute the parts to, or share with, other users connected to the user, e.g., friends in the social network and participate in the system (e.g., 104, 106). In order to determine which friends will store one of the n parts of the user's coin Ci 110, the system in one embodiment may select the direct neighbors (friends, family, etc.) 102, 104 and then, the neighbors that are not directly connected but have friends in common (e.g., 108), and so on until it reaches n.

In one embodiment, in case the user has more direct friends than the n parts or shares, the system in one embodiment may distribute among the friends that have a tighter or closer relationship with the user, for example, family or close friends. Whether a friend is closer to the user may be determined based on relationship type and interactions determined from the social network profile of the user. In one embodiment, the groups of users to select from for sharing the parts may be predefined by the user or the system administrator.

In one aspect, the part of the digital data (e.g., digital coin) is stored in a local storage of a local device or peer device. In one aspect, no centralized server stores the part of the digital coin. A methodology of the present disclosure may be implemented and executed locally on a user's device. The user's device, for example, may include a database to store the digital coins and parts of digital coins from friends.

Figure 2:
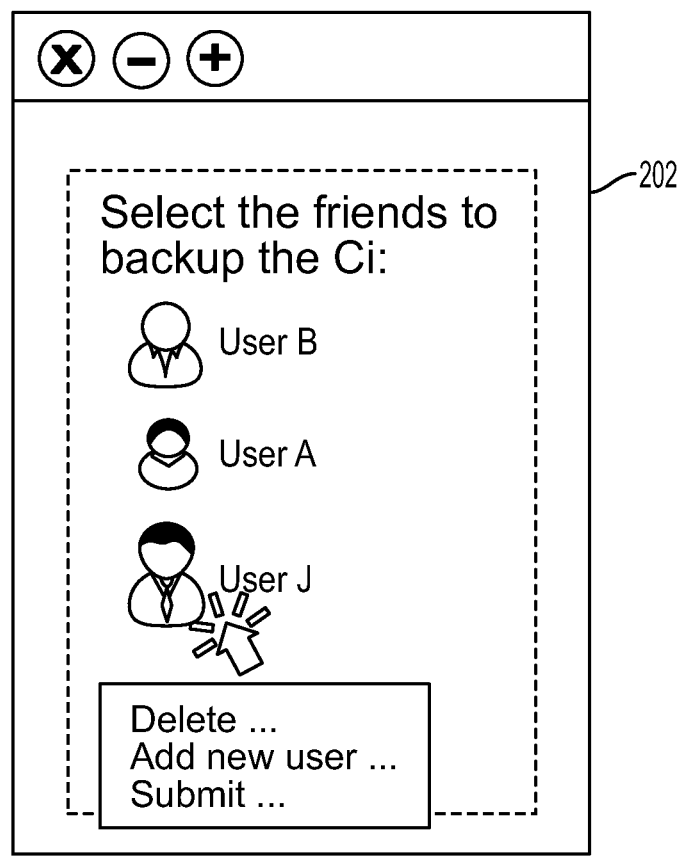
FIG. 2 is illustrates an example of a user interface that presents a list of friends to backup the digital cash.

In one embodiment, the backup may be performed periodically (e.g., at every transaction, every hour, daily, weekly, and/or at other periodic interval), for example, as defined by a system administrator. In one embodiment, the user may select the friends to backup the digital cash or coin. In this case, once the system generates a list of recommended users to store the copy, the user may select all, remove or add new users. The user may also be given an option to adjust the number of parts (n) accordingly to accommodate the number of user selected friends. In one embodiment, this information may be used as a feedback mechanism to improve future recommendations. For instance, FIG. 2 is illustrates an example of a user interface that presents a list of friends to backup the digital cash. A user, for example, may select one or more friends in the list for backing up the digital cash.

In one aspect, the system and/or methodology of the present disclosure may utilize a method of secret sharing to distribute the parts of the coin among the friends in a social network. According to this method, a secret (e.g., the digital cash Ci) is divided into n shares or parts (where n>1) and any subset containing t (threshold) parts can reconstruct the secret, where t<=n. For example, if the coin is divided in 3 parts and the threshold defined as 2, any combination of two friends is sufficient to reconstruct the digital cash.

In one embodiment, the number of parts or shares n and the threshold t may be defined for each digital coin Ci based on the following parameters. Each parameter may have a different weight associated with the respective parameter that can be adjusted dynamically:

(1) Parameters associated with the coin, e.g., the value of the coin, expiration date of the coin. The value of the coin may require more security, for example, the higher the amount, the higher is n and/or t. As another example, if the coin has expiration date that is approaching, for example, the number of may be smaller than for those that have an expiration date that is farther away.

(2) Parameters associated with the social network such as the number of friends, relationship degree, mutual friends, interactions, combination of location and time, availability or connectivity. Each parameter of the social network is described below.

Number of friends. If the user has a high number of friends connected directly, the number of shares may be higher and distributed to more friends. On the other hand, if the user has few friends directly connected in the social network, the n shares may be distributed to friends that are not directly connected to the user (i.e., friends of friends). In this case, the threshold t is set higher to improve security.

Relationship degree indicates the degree of relationship between the users in the social network, for example, family or close friends. If there are more close friends and family in the user's social network the threshold t may be lower due to the higher trust of the friends.

Mutual Friends. If the user has many mutual friends in his/her social network the threshold t may be set low, since the number of connections between the members of network is high.

Interactions indicate the type and frequency of interactions that a user has with his/her friends in the social network (chat, messages, photo exchange, etc.). This affects the type of relationship that the user has with his/her friends. The closer the relationship, more trustworthy the relationship is considered, and the threshold t may be lower.

Combination of location and time. If the friends in the social network posts frequently from the same location and at same timeframe, this may indicate a stable routine. If the user has many friends with stable routine, then the threshold t may be lower.

Availability or Connectivity. This parameter uses cross information of user and friends' availability in certain amount of time. If the user is online at the same time as his/her friends in his social network, the n shares may be set high (depending on the backup periodicity). On the other hand, if most of the friends are offline and the value of the coin is not very high, the threshold t may be set low.

3) Parameters associated with the user such as the geographical location, combination of location and time, type of network. Each of the parameters associated with the user is described below:

Geographical location. If the user uses often the coin in a not secure location, the threshold t may be set high.

Combination of location and time. If the user's friends in the social network posts frequently from the same location and at the same timeframe, this may indicate a stable routine between the user's friends. If the user has many friends with stable routine, then the threshold t may be set lower.

Type of network includes the type of network that the user uses to connect, e.g., a public network, company's wifi, telecom 3G or a home-cable provider or others. This may indicate that using a public wifi is less secure than a home or work wifi connections, thus the number of parts or shares n may be higher.

As a simple use scenario, consider that User B Bob has 10 close friends in an online social network. User B has bought a digital cash equivalent to 50 units. Consider also that many of User B's friends are highly available, i.e., very often connected in a social network system. Consider also that User B uses the digital cash in a not secure location and connects via a public wifi. A methodology of the present disclosure may use these parameters to divide the digital cash in 5 parts or shares and define the minimum parts or threshold to be 3. These parts or shares may be stored in User B's friends and any combination of 3 friends of User B can reconstruct the digital cash. For instance, the digital cash Ci is divided into n shares or parts (where n>1) and any subset containing t (threshold) parts can reconstruct the secret, where t<=n.

In one aspect, a solution to a problem of recoverability of digital cash may be addressed by considering secret sharing to distribute the shares in the social relationship based on a set of characteristics (or parameters) of the digital cash (e.g., value, expiration period), social network (e.g., friends, interactions, relationship, mutual friends, routine, availability), and user (e.g., geographical location, routine). For instance, friends of a social network may store a fraction of the digital cash in memory of the respective friend's local device (e.g., the friend's mobile device or another device). The digital cash may be divided into fractions using secret sharing. The parameters of the secret sharing may be defined based on a set of characteristics, for example, characteristics of the digital cash, social network, and user.

Figure 3:
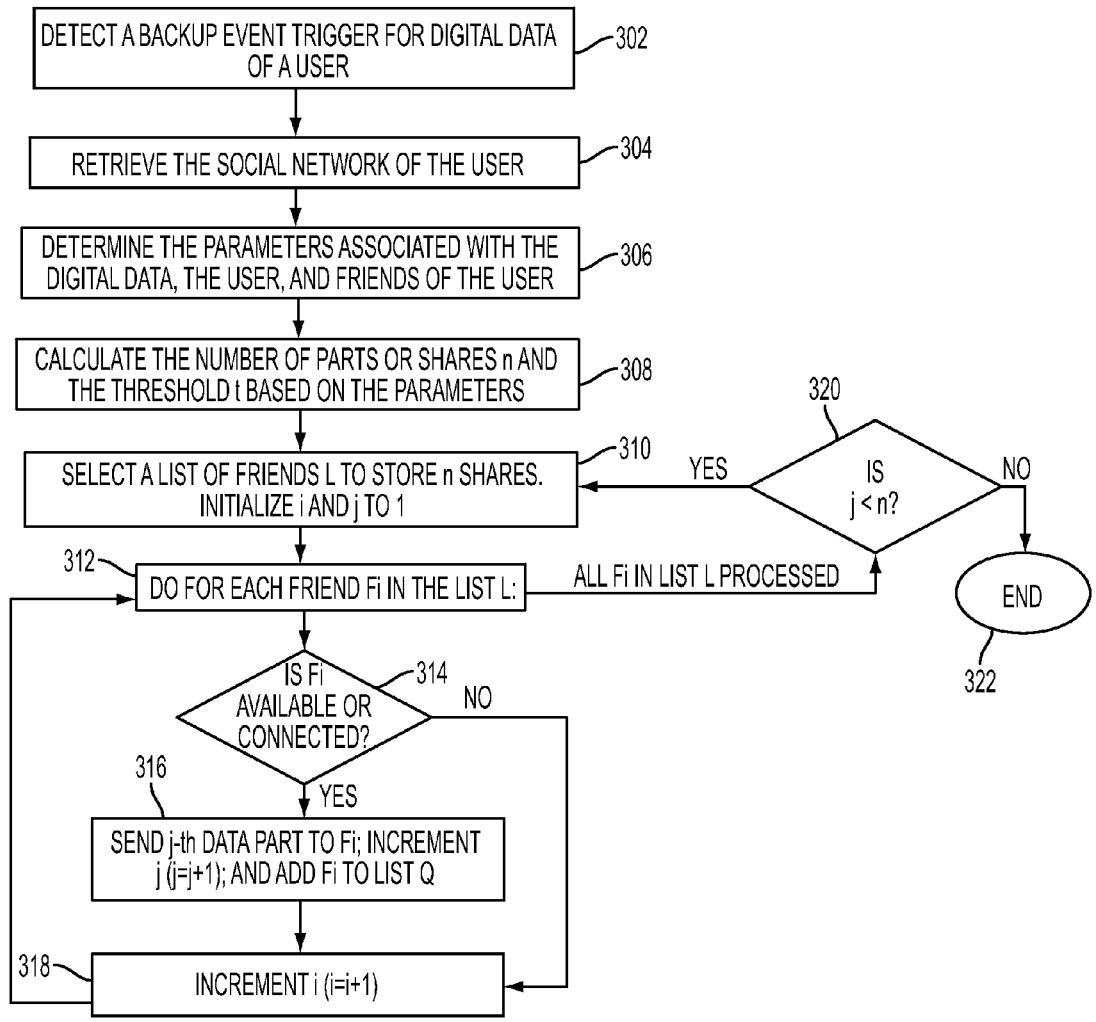
FIG. 3 is a flow diagram illustrating a method of backing up digital data, e.g., digital coin or cash in one embodiment of the present disclosure.

FIG. 3 is a flow diagram illustrating a method of backing up digital data, e.g., digital coin or cash in one embodiment of the present disclosure. At 302, a backup event trigger for digital document or data (e.g., digital coin Ci) associated with a user (e.g., Ui) is detected. In one aspect, the backup event may be triggered by one or more of the following: an automatic system periodically, e.g., a system administrator may define the period or intervals for backup process to be triggered automatically; by a user; and/or automatically responsive to detecting that the user is connected to a social network. In one aspect, the backup event trigger may occur automatically responsive to the user acquiring the digital document or data. In another aspect, the user or another process may invoke a backup or restore functionality.

At 304, the social network of the user (e.g., Ui) is retrieved. For example, social network profile of the user and associated data may be retrieved. The social network contains the friends connected to the user (e.g., Ui). For example, an application programming interface to one or more external social network system or application may enable access to social network data associated with the user and the user's friends.

At 306, from the retrieved social network data, parameters associated with the user (e.g., Ui), and friends (e.g., Fi) of the user (e.g., Ui), are extracted, determined and loaded from a system that stores social network data into a local device's memory. One or more parameters associated with the digital data (e.g., digital coin Ci) may be determined and loaded from the system.

At 308, the number of parts or shares n and the threshold t are calculated, e.g., using one or more of secret sharing or splitting methods based on the parameters. Each parameter p has a weight w associated with it. The weight w may be predefined by a system administrator or the like, and may be adjusted periodically according to the amount and quality of information available.

At 310, a list of friends L is selected to store n shares, e.g., prioritizing the predefined groups. L may be greater than n. If one list contains number of friends less than n, than another list may be used. For example, the list of friends that are directly connected to the user may be selected first. Then if more friends are needed to store n parts or shares, friends that are indirectly connected may be selected. Prioritizing of the list may be performed based on the closeness of the relationship between a friend and the user. For example, the user may define the group of friends that have close relationship with the user. An example of a ranked list of groups defined by the user may be: family, friends that interact every day, co-work, same education background, school, same location or city and acquaintances.

Prioritizing may be performed automatically based on one or more criteria. In another aspect, a user may provide a prioritized list of friends or groups of friends. For example, social network friends may be grouped by their relationship types to the user, e.g., family, co-worker, close friends, and/or others. An example of a ranked list of groups of friends may include in the order: family, close friends, co-works, same education background, school, same location or city, acquaintances. The relationships as to which friend is family, close friends, co-works, have the same education background, went to the same school, are in the same location or city, or are acquaintances, may be determined from the social network profile.

Index values i and j may be initialized (e.g., to 1). At 312, for each friend Fi in the list L, the processing at 314, 316, and 318 may be performed. At 314, if Fi is available or connected and j<=(less than or equal to) n then at 316, j-th data part of n parts (e.g., one of the n parts of the digital coin) is sent to store in Fi's local device storage dedicated to store the shares and digital coins, j is incremented by 1, and the friend Fi is added to the list Q.

At 318, i is incremented by 1, and the processing logic returns to 312 to process another friend in the list L. For example, a part of the digital data divided into the number of parts may be stored in the memory allocated for a friend in the list of friends, each of the parts stored with a different friend in the list of friends.

At 320, if j<n, meaning that not all n shares have been stored using a selected list of friends L, the processing may return to 310 to select another list of friends to continue storing the rest of the n parts or shares. Otherwise, if j>=n, then the backup process ends.

Figure 4:
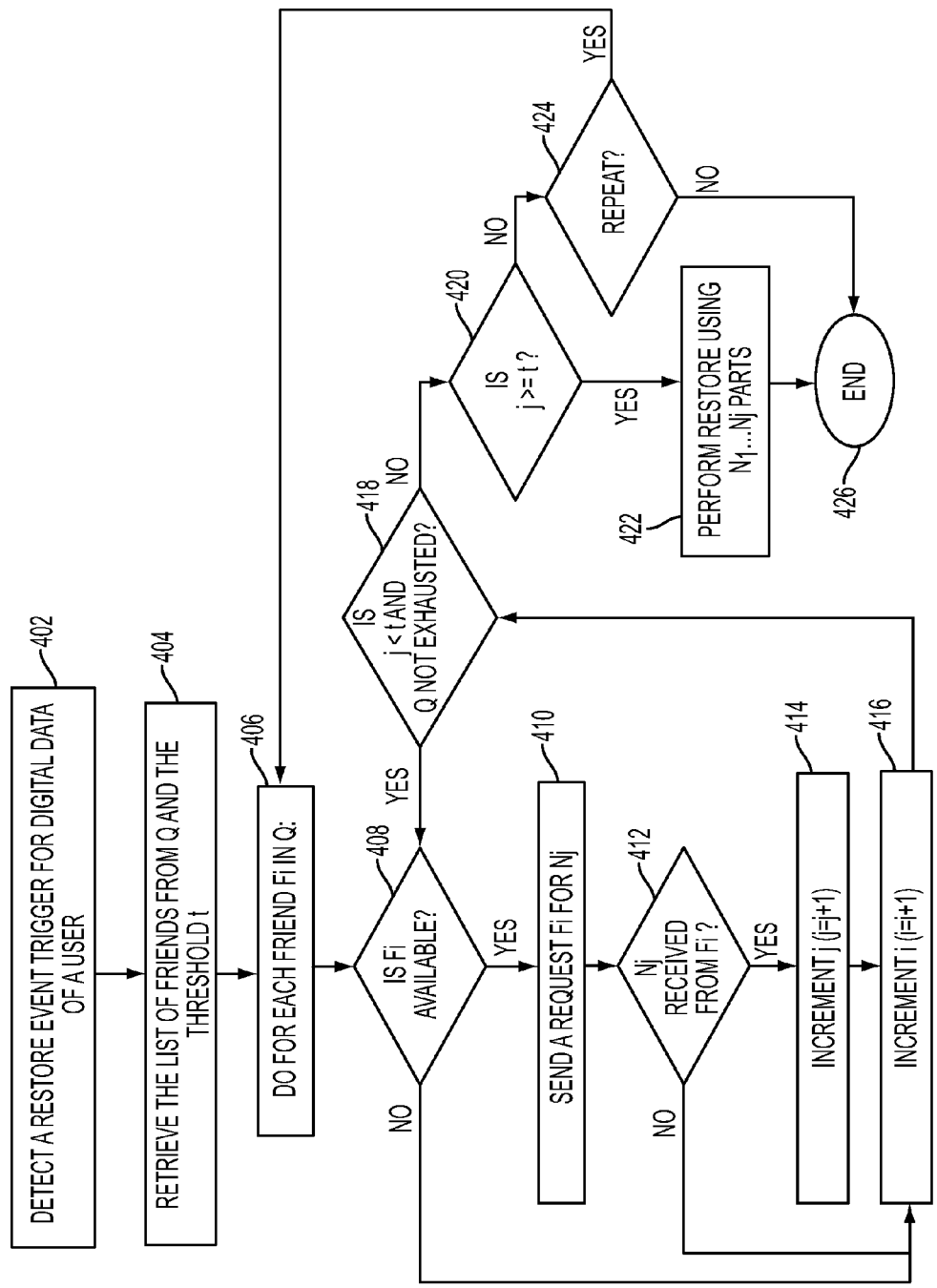
FIG. 4 is a flow diagram illustrating a method of restoring digital data, e.g., digital coin or cash in one embodiment of the present disclosure.

FIG. 4 is a flow diagram illustrating a method of restoring digital data, e.g., digital coin or cash, in one embodiment of the present disclosure. Generally, the digital data may be restored, for instance, by requesting from a friend a part of the digital data and retrieving from memory associated with the friend the part of the digital, to retrieve at least the threshold number of parts from the threshold number of different friends. The digital data may be reconstructed based on the threshold number of parts of the digital data retrieved from the threshold number of friends. More specifically, for example, at 402, a restore event trigger for restoring digital data such as a coin Ci of a user Ui may be detected. At 404, the list of friends from Q and the threshold t are retrieved from memory or storage. The list Q and threshold t, e.g., were saved at the time of the backup procedure. For a friend in the list Q, a request for a part that the friend is storing may be sent and received for restoring the digital data, e.g., digital coin or cash. If a friend is not available or connected, another friend or next friend in the list may be sent a request, to accumulate the required t threshold number of parts for restoring. If less than the t threshold number of parts can be obtained from the friends in the list Q, e.g., because the friends at the time may not be available or connected, the logic may repeat, for example, after a timeout period or a waiting period.

For instance, at 406 index values i and j may be initialized, e.g., to 1, and for each friend Fi in the list Q (e.g., until t threshold is reached), the processing at 408 to 422 may be performed. At 408, if Fi is available or connected and i<=t then the processing at 410, 412 and 414 may be performed. If Fi is not available, the logic may proceed to 416 where index i is incremented to process a next friend in the list Q.

At 410, a request is sent for Ni that is stored in Fi. At 412, if Ui retrieves Nj that is stored in Fi (e.g., Nj is retrieved from Fi's storage) then at 414, j is incremented, e.g., by 1. The logic proceeds to 416, where i is incremented.

At 418, if j is less than the threshold t, i.e., less than the threshold t number of parts have been obtained, and not all friends in the list Q have been requested for the part the respective friend is storing, the logic returns to 408 to send a request to another friend. Otherwise, at 420, if j is greater than equal to the threshold t, i.e., the number of parts needed for restoring and been obtained, the logic proceeds to 422 to perform the restore of the digital data. At 426, the restore process may end. The user may use the restored data. At 420, if j is less than t even after all friends in the list Q have been requested for a part, the restore process may repeat 424 returning to 406, e.g., after a period of time, e.g., timeout or wait time. For instance, the procedure at 406 may repeat after a period of time, for example, for a friend to become available for retrieving Nj. In another aspect, the user may be notified that the restore failed, and the restore process may end without repeating or attempting another restore.

Figure 5:
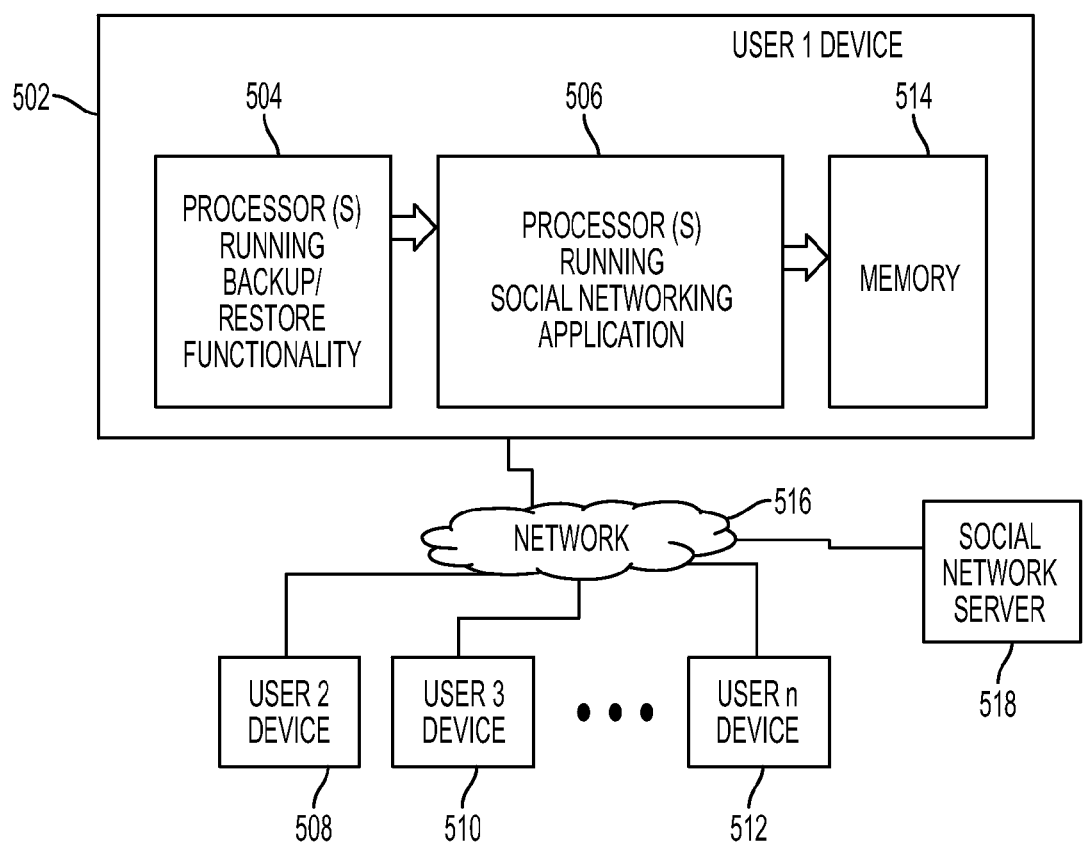
FIG. 5 is a diagram illustrating components of backing up and restoring digital data in one embodiment of the present disclosure.

FIG. 5 is a diagram illustrating logical system components that may implement backup and restore techniques of digital data in one embodiment of the present disclosure. A user using a user device 502, for example, may select to backup and/or restore digital data such as digital coin by running a backup/restore functionality 504 running in the user's device 502, for example, described above. Examples of user devices (e.g., 502, 508, 510, 512) may include but are not limited to a user computer, a laptop, a tablet, mobile phone, or another mobile device, which may include one or more processors. In one aspect, the backup/restore functionality 504 may be run on a user's device locally. In another aspect, the backup/restore functionality 504 may be run on a remote processor or computer. Using a user device (e.g., 502) a user may invoke the backup/restore functionality 504 to backup and/or restore digital data, e.g., as described above. In another aspect, the backup/restore functionality 504 may be invoked automatically: for example, responsive to the user acquiring the digital data or connecting to a network 516, a backup event trigger may be generated automatically. Responsive to detecting or receiving a backup selection (e.g., event trigger) to backup digital data (e.g., digital coin), the backup/restore functionality 504 may retrieve an online social network profile of the user by connecting to an external social networking tool, platform or application (e.g., social networking application server 518) via a social networking application interface 506, for example, deployed on the user's device 502. The social network application interface 506 may be a client-side application (e.g., a web browser interface) that communicates with a server side application 518. In the present disclosure, a social networking application refers generally to both the client-side application 506 and the server-side application 518 acting in concert to provide a user with social networking capabilities. The social networking application, for example, allows users via user devices, e.g., 502, 508, 510, 512, to connect to one another, communicate and share information online, e.g., using various social media tools. The user devices shown at 508, 510, 512 also may include the components 504, 506, 514 shown in user's device at 502. The social networking application interface 506 may run on one or more processors. In one aspect, one or more processors running the social networking application interface may also run the backup/restore functionality 504. In another aspect, the social networking application interface 506 and the backup/restore functionality 504 may run on different processors. Information from the social networking application or server (e.g., 518) may be retrieved by utilizing an application programming interface. In one embodiment, a process that implements a methodology of the present disclosure may run or execute at a user's local device without central authority or server, e.g., decentralized based on peer-to-peer system.

The backup/restore functionality 504 may determine parameters associated with the digital data, the user, and social network friends of the user, e.g., as described in more detail above. The parameters associated with the user and the social network friends of the user may be determined at least from the online social network profile of the user retrieved from the social networking application. For instance, the backup/restore application 504 may store the user's interests, user's friends and other information, in memory 514 received from the social networking application or tool. Each user of the backup/restore system may have an allocated memory or storage (e.g., 514).

The backup/restore functionality 504 may determine a number of parts and a threshold based on the parameters. The backup/restore functionality 504 may select a list of friends from the social network friends to store the number of parts. The backup/restore functionality 504 may store a part of the digital data divided into the number of parts in memory of a selected friend's device (e.g., 508, 510, 512). In another aspect, the backup/restore functionality 504 may store a part from a friend with the friend's identification in its memory 514.

Responsive to detecting or receiving a restore operation selection, the backup/restore functionality 504 may request from the friends (those that have backed-up copies of the parts) the parts of the digital data. For example, a part of the digital data associated with a friend may be retrieved from the memory associated with a friend (e.g., 508, 510, 512). The requests may be made to a number of friends that are storing the parts until the threshold number of parts needed to reconstruct the digital data is obtained. The backup/restore functionality 504 may then reconstruct the digital data based on the threshold number of parts of the digital data retrieved from the threshold number of friends. In one aspect, the restoring may be initiated automatically, for example, responsive to a user using the digital data. In another aspect, a user or another process may invoke a restore operation.

Figure 6:
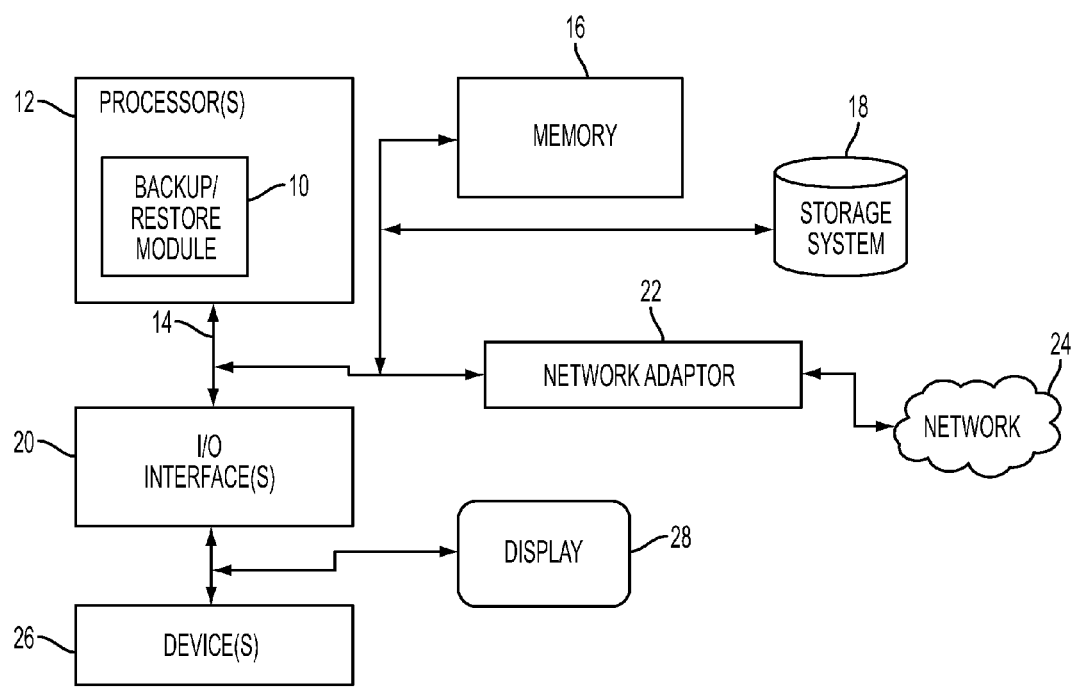
FIG. 6 illustrates a schematic of an example computer or processing system that may implement a backup and restore system in one embodiment of the present disclosure.

FIG. 6 illustrates a schematic of an example computer or processing system that may implement a backup and restore system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. For example, a user's device may include the components shown in FIG. 6.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a backup/restore module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer readable storage medium storing a program of instructions executable by a machine to perform a method of backing up digital data, the method comprising:
   detecting a backup event trigger to backup digital data representing digital cash of a user;
   retrieving online social network profile of the user;
   determining parameters associated with the digital data, the user, and social network friends of the user, the parameters associated with the user and the social network friends of the user determined at least from the online social network profile of the user;
   determining a number of parts and a threshold based on the parameters, wherein the threshold is defined to be less than or equal to the number of parts, the threshold representing a minimum number of parts required to restore the digital data, wherein the parameters comprise at least an expiration date associated with the digital cash, and wherein the threshold is set to be smaller for an expiration date that is approaching than an expiration date that is farther away;
   dividing the digital data using one or more of secret sharing and splitting method into the number of parts;
   selecting a list of friends from the social network friends to store the number of parts;
   storing a part of the digital data divided into the number of parts in a respective friend's device, each of the parts stored with a different friend in the list of friends;
   requesting from the friend the part of the digital data and retrieving from the friend's device the part of the digital data, to retrieve at least the threshold number of parts from the threshold number of friends; and
   reconstructing the digital data using the one or more of secret sharing and splitting method, based on the threshold number of parts of the digital data retrieved from the threshold number of friends.

2. The computer readable storage medium of claim 1, further comprising receiving from the friend's device a friend's digital data part and storing the friend's digital data part in a device of the user.

3. The computer readable storage medium of claim 2, wherein the parameters comprise at least one or more of value of the digital cash and expiration date of the digital cash.

4. The computer readable storage medium of claim 1, wherein the parameters comprises one or more combinations of number of the social network friends of the user, number of social network connections of the user, social network attributes, relationships between the connections, degree of the relationships, interactivity among the connections, number of mutual friends among the user and the social network friends, number of interactions among the social network friends and the user, availability, location and time of the interactions.

5. The computer readable storage medium of claim 1, wherein the parameters associated with the user comprises one or more combinations of geographical location where the user uses the digital data, frequency of use at a location and timeframe and type of network via which the user uses the digital data.

6. The computer readable storage medium of claim 1, wherein the list of friends is prioritized based on a relationship type between the user and the list of friends.

7. A system of backing up digital data, comprising:
   a processor operable to detect a backup event trigger to backup digital data representing digital cash of a user,
   the processor further operable to retrieve online social network profile of the user,
   the processor further operable to determine parameters associated with the digital data, the user, and social network friends of the user, the parameters associated with the user and the social network friends of the user determined at least from the online social network profile of the user,
   the processor further operable to determine a number of parts and a threshold based on the parameters and store the number of parts and the threshold in memory, wherein the threshold is defined to be less than or equal to the number of parts, the threshold representing a minimum number of parts required to restore the digital data, wherein the parameters comprise at least an expiration date associated with the digital cash, and wherein the threshold is set to be smaller for an expiration date that is approaching than an expiration date that is farther away;
   the processor further operable to select a list of friends from the social network friends to store the number of parts,
   the processor further operable to transmit a part of the digital data divided into the number of parts to a respective friend's device for storing in the respective friend's device, each of the parts stored with a different friend in the list of friends; and
   wherein the processor is further operable to request from the friend the part of the digital data and retrieve from the friend's device the part of the digital data, to retrieve at least the threshold number of parts from the threshold number of friends, the processor further operable to reconstruct the digital data using the one or more of secret sharing and splitting method, based on the threshold number of parts of the digital data retrieved from the threshold number of friends.

8. The system of claim 7, wherein the parameters comprise at least one or more of value of the digital cash and expiration date of the digital cash.

9. The system of claim 7, wherein the parameters comprises one or more combinations of number of the social network friends of the user, number of social network connections of the user, social network attributes, relationships between the connections, degree of the relationships, interactivity among the connections, number of mutual friends among the user and the social network friends, number of interactions among the social network friends and the user, availability, location and time of the interactions.

10. The system of claim 7, wherein the parameters associated with the user comprises one or more combinations of geographical location where the user uses the digital data, frequency of use at a location and timeframe and type of network via which the user uses the digital data.

11. The system of claim 7, wherein the list of friends is prioritized based on a relationship type between the user and the list of friends.

* * * * *